United States Patent
Mahajan et al.

(10) Patent No.: US 8,521,755 B2
(45) Date of Patent: Aug. 27, 2013

(54) FLEXIBLE CUBE DATA WAREHOUSING

(75) Inventors: Rahul Mahajan, New Delhi (IN); Dinesh Pandey, Haryana (IN); Stephen Kirkby, Unley Park (AU)

(73) Assignee: Accenture Global Services Limited, Dublin (IE)

( * ) Notice: Subject to any disclaimer, the term of this patent is extended or adjusted under 35 U.S.C. 154(b) by 278 days.

(21) Appl. No.: 12/857,152

(22) Filed: Aug. 16, 2010

(65) Prior Publication Data

US 2011/0055146 A1 Mar. 3, 2011

Related U.S. Application Data

(60) Provisional application No. 61/238,373, filed on Aug. 31, 2009.

(51) Int. Cl.
*G06F 17/30* (2006.01)
*G06F 17/00* (2006.01)

(52) U.S. Cl.
USPC .......................................... 707/756; 707/759

(58) Field of Classification Search
USPC .................. 707/756, 759; 717/120; 709/202
See application file for complete search history.

(56) References Cited

U.S. PATENT DOCUMENTS

| | | | |
|---|---|---|---|
| 7,421,740 B2 * | 9/2008 | Fey et al. .......................... | 726/28 |
| 7,734,649 B2 * | 6/2010 | Li et al. .......................... | 707/785 |
| 7,953,694 B2 * | 5/2011 | Colossi et al. ................. | 707/600 |
| 2002/0016924 A1 | 2/2002 | Shah et al. | |
| 2002/0059183 A1 | 5/2002 | Chen | |
| 2004/0267751 A1 | 12/2004 | Dill et al. | |
| 2006/0116859 A1 | 6/2006 | Legault et al. | |
| 2008/0208918 A1 | 8/2008 | Yang et al. | |

FOREIGN PATENT DOCUMENTS

| | | |
|---|---|---|
| CN | 101111839 A | 1/2008 |
| JP | 11-316766 A | 11/1999 |
| JP | 2000-285128 A | 10/2000 |
| WO | 2006064382 A2 | 6/2006 |

* cited by examiner

*Primary Examiner* — Yicun Wu
(74) *Attorney, Agent, or Firm* — Mannava & Kang, P.C.

(57) ABSTRACT

An online analytical processing (OLAP) specification system for specifying a new OLAP cube from an OLAP cube template including an OLAP cube template determination module determining the OLAP cube template and retrieve a corresponding template metadata file, the template metadata file including metadata defining the structure of the OLAP cube template. The OLAP specification system also includes a metadata copy module copying the template metadata file to create a base metadata file. The OLAP specification system also includes a viable options generation module generating and presenting viable options for modifying metadata in the base metadata file to define the new OLAP cube, where the viable options for modifying metadata in the base metadata file conforms with one or more predetermined rules. The OLAP specification system further includes a metadata receipt module receiving input via a user interface indicating a modification to the metadata in the base metadata file based on the presented viable options and storing the modified base metadata file as a new metadata file defining the new OLAP cube.

17 Claims, 5 Drawing Sheets

Determine OLAP cube template and retrieve template metadata file corresponding to determined OLAP cube template
201

Copy the retrieved template metadata file to create a base metadata file
202

Generate and present viable options for modifying the base metadata file to define a new OLAP cube
203

Receive input for modifying the base metadata file to define the new OLAP cube based on the viable options
204

Store the modified metadata as a new metadata file defining the new OLAP cube
205

FLEXIBLE CUBE DATA WAREHOUSING

PRIORITY

This application claims priority to U.S. Provisional patent application Ser. No. 61/238,373, filed on Aug. 31, 2009, and entitled "Flexible Cube Data Warehousing", which is incorporated by reference in its entirety.

BACKGROUND

Online analytical processing (OLAP) is a category of tools, such as applications and software, used to provide access to data in a database. With OLAP, multidimensional analytical queries can be quickly answered. Databases configured for OLAP may use a multidimensional data model that provides multidimensional views of data for quick access to strategic information for further analysis.

OLAP tools use OLAP cubes to achieve efficient data retrieval. An OLAP cube is a data structure that organizes categories of data by dimensions and measures. A measure represents a fact or a number value. A dimension represents descriptive categories of data. For example, a measure may be the actual data value that occupies a cell as defined by the dimensions selected for a view. An OLAP cube may have any number of dimensions.

A simple example may include time, product and location as three dimensions of the cube, representing descriptive categories of data. A measure is a discrete data element in the cube. Any number of dimensions can be added to the OLAP cube, such as store, cashier, or customer in this case. This allows an analyst to view the measures along any combination of the dimensions.

Conventionally, for data warehousing reporting, a technical solution team defines the OLAP cube and then reports to users, such as business analysts, what was done using only the defined OLAP cube structure. If users want to change the OLAP cube, such as add or remove dimensions, a cumbersome process must be followed by the technical solution team to properly implement the changes. The back-and-forth communications and processes needed to implement changes to the OLAP cube are burdensome, non-timely, and can cause analysts frustration when trying to get different views of the data to answer critical business intelligence questions in a reasonable time period.

SUMMARY OF THE INVENTION

According to an embodiment, an OLAP specification system for specifying a new OLAP cube from an OLAP cube template includes an OLAP cube template determination module, a metadata copy module, a viable options generation module and a metadata receipt module. The OLAP cube template determination module is configured to determine the OLAP cube template and retrieve a corresponding template metadata file, the template metadata file including metadata defining the structure of the OLAP cube template. The metadata copy module is configured to copy the template metadata file to create a base metadata file. The viable options generation module is configured to generate and present viable options for modifying metadata in the base metadata file to define the new OLAP cube, wherein the viable options for modifying metadata in the base metadata file conforms with one or more predetermined rules. The metadata receipt module is configured to receive input via a user interface indicating a modification to the metadata in the base metadata file based on the presented viable options and to store the modified base metadata file as a new metadata file defining the new OLAP cube.

According to an embodiment, a method for specifying a new OLAP cube from an OLAP cube template includes determining the OLAP cube template. The method also includes retrieving a corresponding template metadata file, the template metadata file including metadata defining the structure of the OLAP cube template and copying the template metadata file to create a base metadata file. The method includes generating viable options for modifying metadata in the base metadata file to define the new OLAP cube, wherein the viable options for modifying metadata in the base metadata file conforms with one or more predetermined rules and presenting the viable options to the user. The method further includes receiving input from the user indicating a modification to the metadata in the base metadata file based on the presented viable options and storing the modified base metadata file as a new metadata file defining the new OLAP cube. According to an embodiment, the method described above may be embodied in a computer program stored on a non-transitory computer readable medium, which when executed by a computer system performs the method.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments. Furthermore, different embodiments are described below. The embodiments may be used or performed together in different combinations.

1. Overview

According to an embodiment, an OLAP specification system provides users an opportunity to specify a structure of a new OLAP cube from an OLAP cube template. The structure of an OLAP cube may be defined by metadata. The metadata may describe a schema of the OLAP structure, including dimensions, hierarchies and categories. Dimensions may have different levels of categories in hierarchy. A category is a member of a dimension and may include an item matching a specific description or classification. For example, a category may be years in a time dimension. Categories can be considered hierarchies in that the categories are organized in different levels having parents and children. An example of a hierarchy for the geographic location dimension is city, state, zip code, region, and country. A drill-down operation may be performed on an OLAP cube to view data at different levels of the hierarchy. A drill-up operation may also be performed. A parent category may be the next higher level of another category in a drill-up operation. A child category may be the next lower level of another category in a drill-down operation.

In one embodiment, an OLAP cube template of an OLAP cube with preset dimensions and data-access rules is defined in a read-only template metadata file. When new metadata is introduced to a copy of the template metadata file of the OLAP cube template, a new OLAP cube is created. Thus, metadata may define a new OLAP cube. The specification of the new OLAP cube from an OLAP cube template may be created as data is being viewed, without a technical solutions team having to perform a cumbersome process to implement changes to the structure of the OLAP cube currently being viewed.

Through a user interface, a user may define new metadata for the new OLAP cube. A user may specify or modify dimensions and hierarchies as needed. A user may also specify slicing clauses as needed. The user-initiated process of navigating an OLAP cube by requesting page displays interactively through the specification of slices via rotations and drill-down/drill-up operations is sometimes called "slice and dice". The OLAP specification system allows a user to specify a slice clause to retrieve a subset of a multi-dimensional array. The OLAP specification system allows users request a list of dimensions for an existing OLAP cube, and add, remove or modify dimensions from the list. The OLAP specification system also allows a user to request a list of hierarchies for every dimension of the cube and add, remove or modify hierarchies. A user may also specify the order of a dimension and its respective hierarchy via the OLAP specification system.

The OLAP specification system also provides users an opportunity to specify data-access rules limiting data access on any category of any dimension. Data-access rules may be defined by a dimension of an OLAP cube to ensure data is only extracted based on the data-access rules.

2. System

Figure 1:
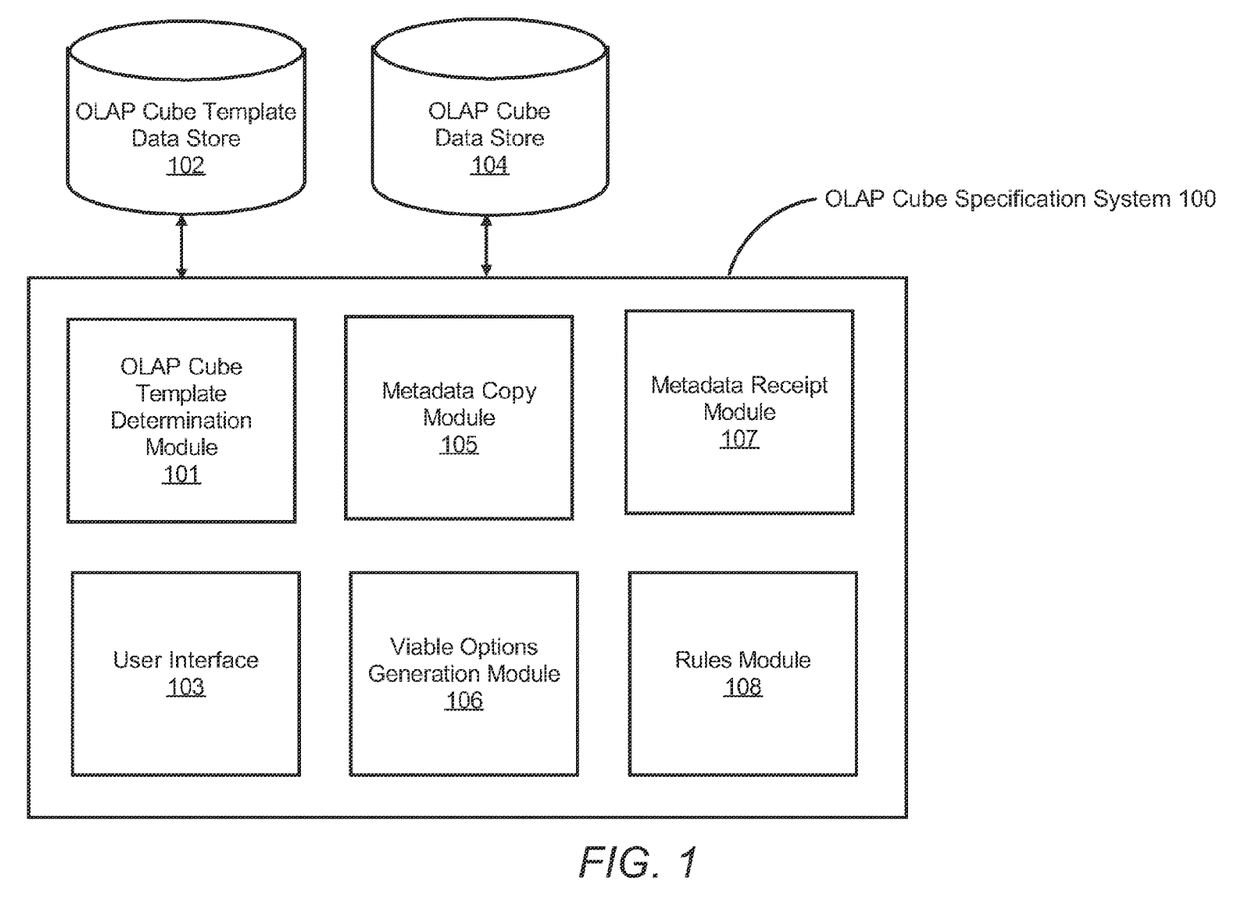
FIG. 1 illustrates an OLAP cube specification system, according to an embodiment.

FIG. 1 illustrates an OLAP cube specification system 100, according to an embodiment. The OLAP cube specification system 100 includes an OLAP cube template determination module 101, an OLAP cube template data store 102, a user interface 103, an OLAP cube data store 104, a metadata copy module 105, a viable options generation module 106, a metadata receipt module 107 and a rules module 108.

The OLAP cube template determination module 101 is configured to determine an OLAP cube template to serve as a generic template to create a new OLAP cube and retrieve a corresponding template metadata file. The OLAP cube template is an OLAP cube with preset dimensions and data-access rules defined by metadata in a read-only template metadata file. The OLAP specification system 100 may have multiple types of OLAP cube templates for different purposes. The template metadata file for the OLAP cube templates are stored in the OLAP cube template data store 102. A user may select the appropriate type of OLAP cube template. The template metadata file for the OLAP cube template is selected and retrieved from the OLAP cube template data store 102 when the user selects the OLAP cube template via the user interface 103. In another example, an existing OLAP cube is identified by a user via the user interface 103. A metadata file for the existing OLAP cube is retrieved from the OLAP cube data store 104 and is considered the template metadata file.

The metadata copy module 105 copies the retrieved template metadata file to serve as a base metadata file from which a new OLAP cube may be created. The base metadata file includes the metadata defining the OLAP cube of the OLAP cube template. As discussed above, the structure of an OLAP cube is generally defined by metadata. Metadata represents a schema of the OLAP structure, including dimensions, hierarchies and categories. The metadata in the base metadata file may be modified to create a new OLAP cube.

The viable options generation module 106 generates viable options for modifying a dimension defined by metadata in the base file and presents the viable options via the user interface 103. A viable option is a modification that is in compliance with a predetermined rule. For example, the user interface 103 permits a user to input modifications to the metadata in the base file. The user can modify dimensions and hierarchies through the user interface 103. The modifications may include adding, removing or changing dimensions, categories, and hierarchies in the base file by changing the metadata or inserting new metadata. The order of dimensions may also be changed via the user interface 103. The order of categories of a dimension can be specified via the user interface 103. For example, if a sales data dimension includes Q1-Q4 categories, the order for displaying the data may be specified from earliest to latest quarter, such as from Q1 to Q4. Modifications may be provided by the user in a slicing clause, as discussed above.

However, the metadata in the base file does not allow a user to modify all dimensions in any manner. The metadata defining the OLAP cube template only allows certain aspects of the dimensions to be modified, and these modifiable aspects are referred to as the viable options. For example, a rule may specify that certain levels of a dimension must stay grouped in a view. For example, the dimension is time, and the levels of the dimension are years, month, and quarters. The user interface 103 allows the years and month to moved to generate a view but they cannot be separated. For example, if geography is another level, the view may have an order of country, year, month and state, but cannot have an order of country, year, state month. Also, the dimensions and levels may be preconfigured based on the granularity of the data in the data warehouse. Rules other than grouping rules may also be enforced.

The metadata receipt module 107 receives input via the user interface 103 for modifying the metadata of the base metadata file to define a new OLAP cube based on the presented viable options. The input may be modifications to the metadata of the base file that are constrained by the viable options. The modified metadata is stored as a new metadata file in the OLAP cube data store 104. The new metadata file defines a new OLAP cube in the OLAP cube data store 104. The structure of the new OLAP cube reflects the new metadata file. The new OLAP cube is ready for further use. For example, slicing and drill down operations may be performed on the new OLAP cube. Meanwhile, the OLAP cube template is preserved in its original state for reuse in the OLAP cube template data store 102.

The user interface 103 also permits users to view lists of OLAP cubes, dimensions and hierarchies of OLAP cubes, view a dimension retrieved as a result of an OLAP operation, etc.

The rules module 108 is configured to receive rules for data access. For example, a system administrator, who may have all the rights on the application, creates the rules for data access and inputs the rules into the OLAP specification system 100 via the user interface 103. The rules may be based on type of user or based on other user characteristics. The rules, for example, identify whether a dimension is accessible or not accessible to a particular user. The OLAP specification system 100 stores the rules for data access in the form of a dimension for an OLAP cube. This dimension is referred to as a rules dimension. The rules may be used to determine the viable options.

Figure 3:
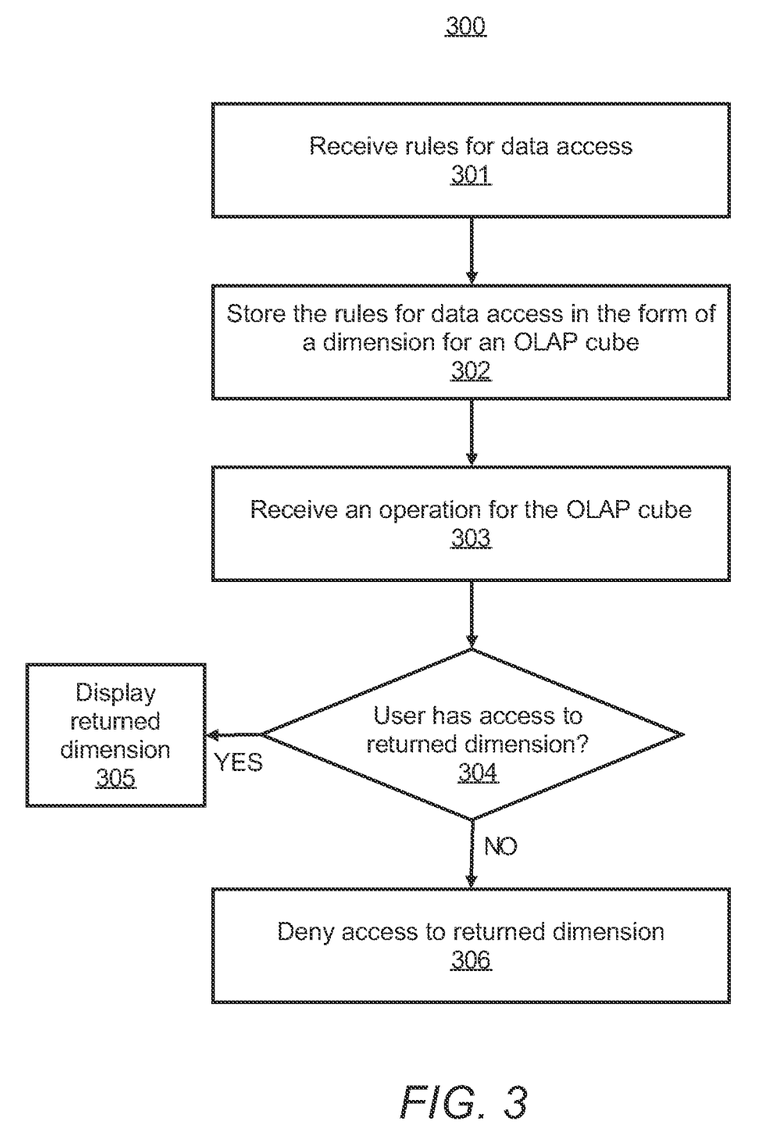
FIG. 3 illustrates a method for restricting access to an OLAP cube dimension, according to an embodiment.

An operation for the OLAP cube may received at the user interface 103. For example, a user specifies an operation to be performed on the OLAP cube having the rules for data access as a dimension. The operation may be a slicing operation, a drill down operation, etc. allowing the user can view data in a desired manner. The rules module 108 determines whether the user has access to a dimension that is being returned as a result of the operation entered by the user at the user interface 103. For example, the OLAP specification system 100 performs the operation of step 303 described with respect to the method 300 below. The operation returns a particular dimension. The rules module 108 accesses the rules dimension to determine if the user can access the returned dimension. For example, the rules dimensions indicates that the user must be of a business analyst type to access the returned dimension. The rules module 108 accesses stored attributes for the user to determine whether the user is a business analyst. If the user is a business analyst, the user is given access to the returned dimension. For example, the returned dimension is displayed for the user. If the user is not a business analyst, the user never sees the non-accessible data or non-accessible levels and may not know the OLAP specification system 100 has some other data other than what can be seen. If the user is determined to have access to the dimension by the rules module 108, access to the dimension is granted to the user by updating the rules dimension with relevant data-access values. Any query to the OLAP cube will also have values for the rules dimension, based on what data to allow and what data not to show. Granting access may allow the user to modify the dimension or view the dimension. If the user does not have access as determined by the rules module 108, the user is denied access to the returned dimension.

3. Method for Specifying a New OLAP Cube

Figure 2:
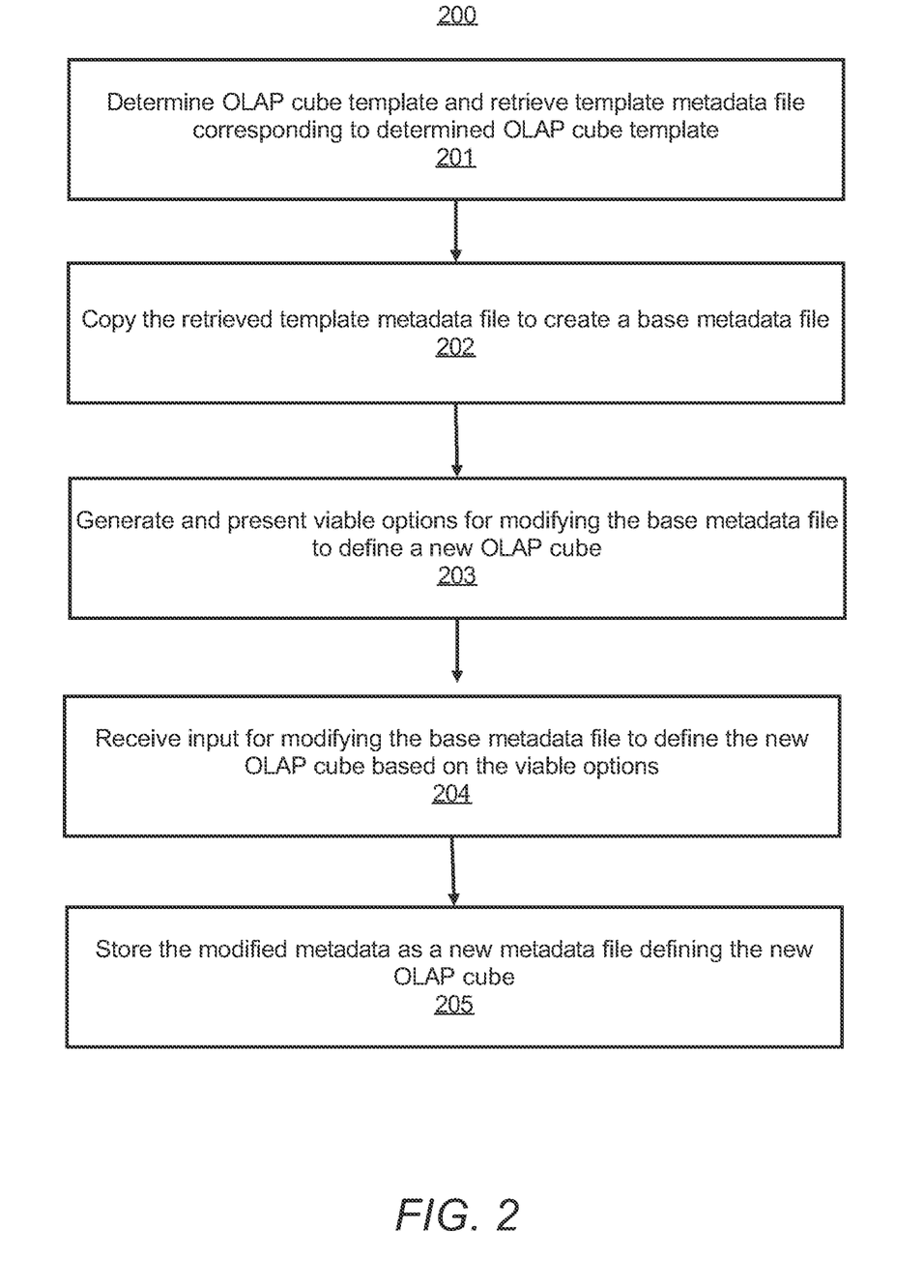
FIG. 2 illustrates a method for specifying a new OLAP cube, according to an embodiment.

FIG. 2 illustrates a flow chart of a method 200 for specifying a new OLAP cube, according to an embodiment. The method 200 may be implemented on the OLAP specification system 100 described above referring to FIG. 1 by way of example and not limitation. The method 200 may be practiced in other systems.

At step 201, the OLAP specification system 100 determines an OLAP cube template to serve as a generic template to create a new OLAP cube and retrieves a corresponding template metadata file. As discussed above, the OLAP cube template is an OLAP cube with preset dimensions and data-access rules defined by metadata in a read-only template metadata-file. The OLAP specification system 100 may have multiple types of OLAP cube templates for different purposes. Thus, a user may select the appropriate type of OLAP cube template.

At step 202, the OLAP specification system 100 copies the retrieved template metadata file to serve as a base metadata file from which a new OLAP cube may be created. The base metadata file includes the metadata defining the OLAP cube of the OLAP cube template. As discussed above, the structure of an OLAP cube is generally defined by metadata. The metadata in the base metadata file may be modified to create a new OLAP cube.

At step 203, the OLAP specification system 100 generates viable options for modifying a dimension of the metadata in the base file and presents the viable options via the user interface 103. As discussed above, a viable option for modifying the metadata in the base file is a modification that is in compliance with a predetermined rule. For example, the metadata defining the OLAP cube template only allows certain aspects of dimensions to be modified, and these modifiable aspects are referred to as the viable options.

At step 204, the OLAP specification system 100 receives input for modifying the metadata of the base metadata file to define the new OLAP cube based on the viable options. The input may be modifications to the metadata of the base file that are constrained by the viable options.

At step 205, the modified metadata is stored as a new metadata file defining the new OLAP cube. The structure of the new OLAP cube reflects the new metadata file. The new OLAP cube is ready for further use. For example, slicing and drill down operations may be performed on the new OLAP cube. Meanwhile, the OLAP cube template is preserved in its original state for reuse.

4. Method for Restricting Data Access to OLAP Cube Dimensions

FIG. 3 illustrates a flow chart of a method 300 for restricting access to one or more OLAP cube dimensions, according to an embodiment. The method 300 may be implemented on the OLAP specification system 100 described above referring to FIG. 1 by way of example and not limitation. The method 300 may be practiced in other systems.

At step 301, the OLAP specification system 100 receives rules for data access. For example, a system administrator, who may have all the rights on the application, creates the rules for data access and inputs the rules into the OLAP specification system 100 via the user interface. The rules may be based on type of user or based on other user characteristics. The rules, for example, identify whether a dimension is accessible or not accessible to a particular user.

At step 302, the OLAP specification system 100 stores the rules for data access in the form of a dimension for an OLAP cube. This dimension is referred to as a rules dimension.

At step 303, the OLAP specification system 100 receives an operation for the OLAP cube. For example, a user specifies an operation to be performed on the OLAP cube having the rules for data access as a dimension. The operation may be a slicing operation, a drill down operation, etc. allowing the user can view data in a desired manner.

At step 304, the OLAP specification system 100 determines whether the user has access to a dimension that is being returned as a result of the operation identified at step 303. For example, the OLAP specification system 100 performs the operation of step 303. The operation returns a particular dimension. The OLAP specification system 100 accesses the rules dimension to determine if the user can access the returned dimension. For example, the rules dimensions indicates that the user must be of a business analyst type to access the returned dimension. The OLAP specification system 100 accesses stored attributes for the user to determine whether the user is a business analyst. If the user is a business analyst, the user is given access to the returned dimension. For example, the returned dimension is displayed for the user. If the user is not a business analyst, the user never sees the non-accessible data or non-accessible levels and may not know the OLAP specification system 100 has some other data other than what can be seen.

At step 305, if the user is determined to have access to the dimension, access to the dimension is granted to the user by updating the rules dimension with relevant data-access values. Any query to the OLAP cube will also have values for the rules dimension, based on what data to allow and what data not to show. Granting access may allow the user to modify the dimension or view the dimension. If the user does not have access, at step 306, the user is denied access to the returned dimension. The method 300 may be performed in conjunction with the method 200 to determine whether the user has access to modify and view dimensions.

5. Screenshot

Figure 4:
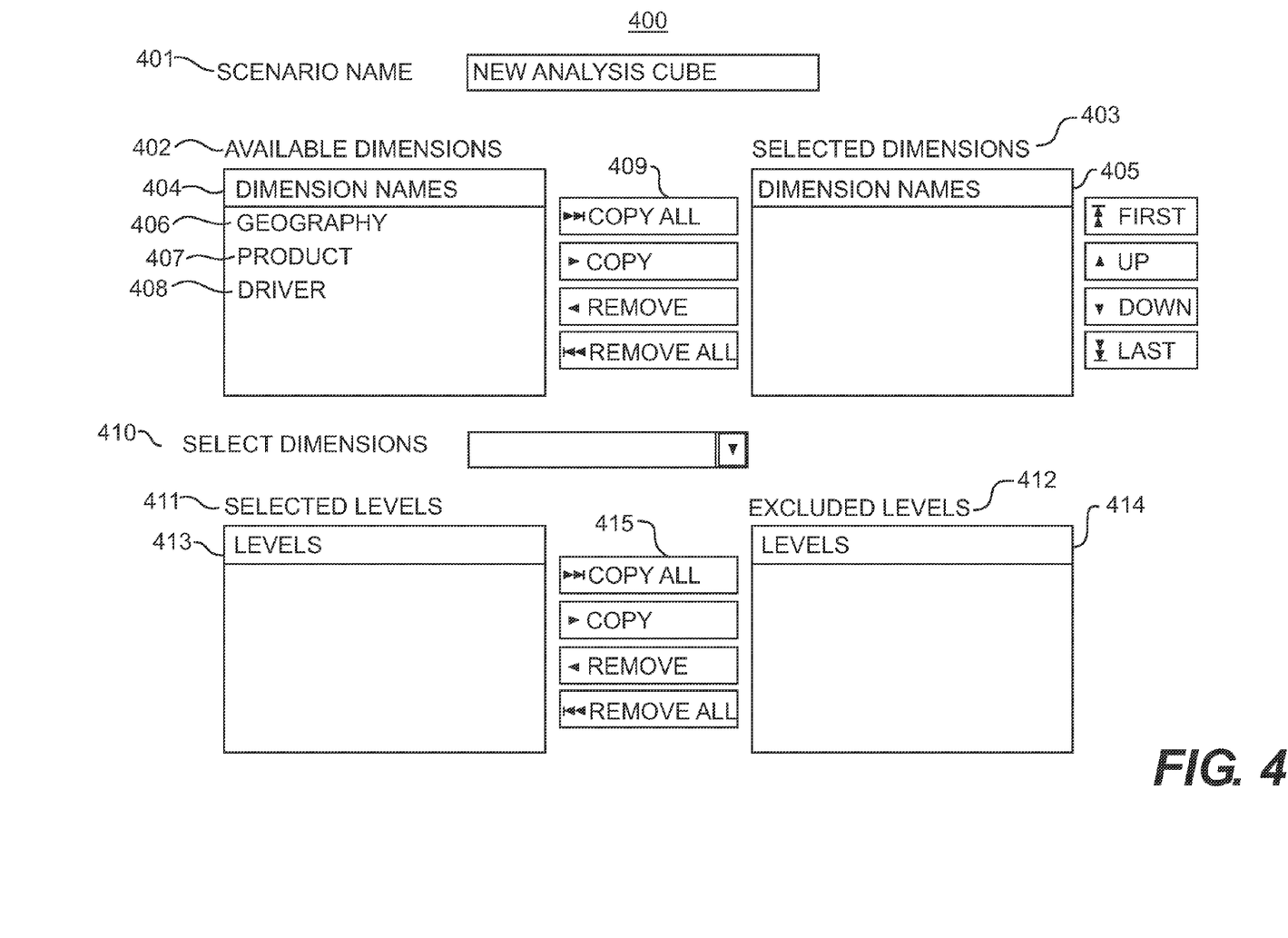
FIG. 4 illustrates a screen shot for an OLAP cube specification system, according to an embodiment

FIG. 4 Illustrates an example of screenshots for the OLAP specification system 100 described above with reference to FIGS. 1-3 by way of example and not limitation.

FIG. 4 illustrates a screen shot presented via the user interface 103 of the OLAP specification system 100. The OLAP specification system 100 includes rules specifying an OLAP cube be defined with at least one dimension, every selected dimension have at least one level, i.e. hierarchy, selected and only associated levels for a selected dimension are to be shown. In FIG. 4, scenario name 401 allows the user to enter a name for a new OLAP cube. In this case, the scenario name 401 is "New Analysis Cube".

Available dimensions 402 show a user dimensions available to be selected for viewing in the new OLAP cube. The available dimensions 402 have dimension names 402 including "Geography" 406, "Product" 407 and "Driver" 408. Selected dimensions 403 show the dimensions selected by the user. Selected dimensions 403 include dimension names 405. In this case, no dimensions have been selected by the user yet. Item 409 illustrates operations that may be performed on the available dimensions 402, i.e. "Copy all", "Copy", "Remove" and "Remove all".

Selected dimension 410 illustrates, of the dimensions that have been selected, i.e. the same list as selected dimensions 403, the selected dimension currently being viewed. In this case, no dimensions have been selected by the user yet. Selected levels 411 shows the user the available levels to select levels of the dimension currently being viewed. The selected levels 411 organize the levels available for the dimension currently being viewed by levels 413. At this time, there is no selected level 411, thus there are no levels 413. Levels may also be excluded. Excluded levels 412 organize the levels excluded for the dimension currently being viewed by levels 414. At this time, there are no excluded levels 412, thus there are no levels 414. Item 415 illustrates operations that may be performed on the selected levels 411, i.e. "Copy all", "Copy", "Remove" and "Remove all".

6. Computer System

Figure 5:
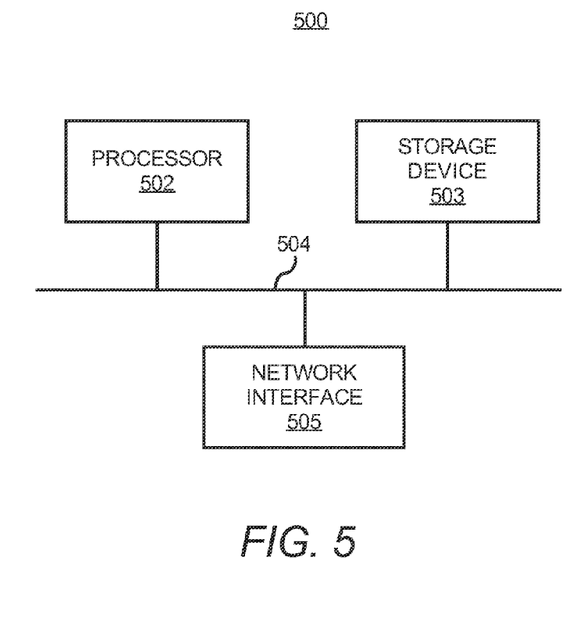
FIG. 5 illustrates a computer system, according to an embodiment.

FIG. 5 shows a computer system 500 that may be used as a hardware platform for the OLAP specification system 100. The computer system 500 may be used as a platform for executing one or more of the steps, methods, and functions described herein that may be embodied as software stored on one or more non-transitory computer readable mediums, such as storage devices.

The computer system 500 includes a processor 502 or processing circuitry that may implement or execute software instructions performing some or all of the methods, functions and other steps described herein. Commands and data from the processor 502 are communicated over a communication bus 504. The computer system 500 also includes a non-transitory computer readable storage device 503, such as random access memory (RAM), where the software and data for processor 502 may reside during runtime. The storage device 503 may also include non-volatile data storage. The computer system 500 may include a network interface 505 for connecting to a network. It will be apparent to one of ordinary skill in the art that other known electronic components may be added or substituted in the computer system 500.

While the embodiments have been described with reference to examples, those skilled in the art will be able to make various modifications to the described embodiments without departing from the scope of the claimed embodiments. Also, the embodiments described herein may be used to alter other data structures that may be defined by metadata.

What is claimed is:

1. An Online Analytical Processing (OLAP) specification system for specifying a new OLAP cube from an OLAP cube template, the system comprising:
    an OLAP cube template determination module to determine the OLAP cube template and retrieve a corresponding template metadata file, the template metadata file including metadata defining the structure of the OLAP cube template;
    a metadata copy module to create a base metadata file from the template metadata file;
    a rules module to receive rules for data access, store the rules, and determine, based on the rules, whether a user has access to a dimension or a level in the dimension in the new OLAP cube, and the rules specify modifiable aspects of dimensions of the new OLAP cube, wherein the rules include a rule to specify that predetermined levels of the dimension must stay grouped in a view;
    a viable options generation module executed by a computer system to generate and present viable options for modifying metadata in the base metadata file to define the new OLAP cube, wherein the viable options for modifying metadata in the base metadata file conforms with the rules;
    a metadata receipt module to receive input via a user interface indicating a modification to the metadata in the base metadata file based on the presented viable options and to store the modified base metadata file as a new metadata file defining the new OLAP cube.

2. The OLAP specification system of claim 1, wherein the modification includes a modification to at least one of a hierarchy of a dimension and an order of categories of the dimension.

3. The OLAP specification system of claim 1, wherein the modification includes a slicing clause for categories of a dimension.

4. The OLAP specification system of claim 1, wherein subsequent operations are performed on the new OLAP cube.

5. The OLAP specification system of claim 1, wherein the rules module is further to:
    grant access to the level in the dimension and members in the level of the dimension in response to a determination that the rules indicate that the user has privileges to access the level of the dimension; and
    deny access to the level of the dimension if the rules dimension indicates the user does not have privileges to access the level of the dimension.

6. The OLAP specification system of claim 1, wherein the rules module further to:
    determine whether a type of user that is allowed access to the dimension or the level is specified in the rules.

7. A method for specifying a new Online Analytical Processing (OLAP) cube from an OLAP cube template, the method comprising:
    determining, by a computer system, the OLAP cube template;
    retrieving a corresponding template metadata file, the template metadata file including metadata defining the structure of the OLAP cube template;
    receiving rules for data access, storing the rules, and determining, based on the rules, whether a user has access to a dimension or a level in the dimension in the new OLAP cube, and the rules specify modifiable aspects of dimensions of the new OLAP cube, wherein the rules include a rule specifying that predetermined levels of the dimension must stay grouped in a view;

creating a base metadata file from the template metadata file;

generating viable options for modifying metadata in the base metadata file to define the new OLAP cube, wherein the viable options for modifying metadata in the base metadata file conforms with the rules;

presenting the viable options to the user;

receiving input from the user indicating a modification to the metadata in the base metadata file based on the presented viable options; and storing the modified base metadata file as a new metadata file defining the new OLAP cube.

8. The method of claim 7, wherein the modification includes a modification to at least one of a hierarchy of a dimension and an order of categories of the dimension.

9. The method of claim 7, wherein the modification includes a slicing clause for categories of a dimension.

10. The method of claim 7, further comprising:
performing subsequent operations on the new OLAP cube.

11. The method of claim 7, further comprising:
granting access to the level in the dimension and members in the level of the dimension if the rules indicate the user has privileges to access the level of the dimension; and denying access to the level of the dimension if the rules indicate the user does not have privileges to access the level of the dimension.

12. The method of claim 7, wherein determining whether a user has access to a dimension in the OLAP cube by accessing the rules further comprises:
determining whether a type of user that is allowed access to the dimension or the level is specified in the rules.

13. A non-transitory computer readable medium having stored thereon a computer executable instructions for specifying a new Online Analytical Processing (OLAP) cube from an OLAP cube template, the computer executable instructions, when executed cause a computer system to implement a method comprising:

determining the OLAP cube template;

retrieving a corresponding template metadata file, the template metadata file including metadata defining the structure of the OLAP cube template;

receiving rules for data access, storing the rules, and determining, based on the rules, whether a user has access to a dimension or a level in the dimension in the new OLAP cube, and the rules specify modifiable aspects of dimensions of the new OLAP cube, wherein the rules include a rule to specify that predetermined levels of the dimension must stay grouped in a view;

creating a base metadata file from the template metadata file;

generating viable options for modifying metadata in the base metadata file to define the new OLAP cube, wherein the viable options for modifying metadata in the base metadata file conforms with rules;

presenting the viable options to the user;

receiving input from the user indicating a modification to the metadata in the base metadata file based on the presented viable options; and storing the modified base metadata file as a new metadata file defining the new OLAP cube.

14. The non-transitory computer readable medium of claim 13, wherein the modification includes a modification to at least one of a hierarchy of a dimension and an order of categories of the dimension.

15. The non-transitory computer readable medium of claim 13, wherein the modification includes a slicing clause for categories of a dimension.

16. The non-transitory computer readable medium of claim 13, further comprising:
performing subsequent operations on the new OLAP cube.

17. The non-transitory computer readable medium of claim 13, wherein the method further comprises:

granting access to the level in the dimension and members in the level of the dimension in response to a determination that the rules dimension indicates the user has privileges to access the level of the dimension; and denying access to the level of the dimension in response to a determination that the rules dimension indicates the user does not have privileges to access the level of the dimension.

* * * * *